Figure 1:
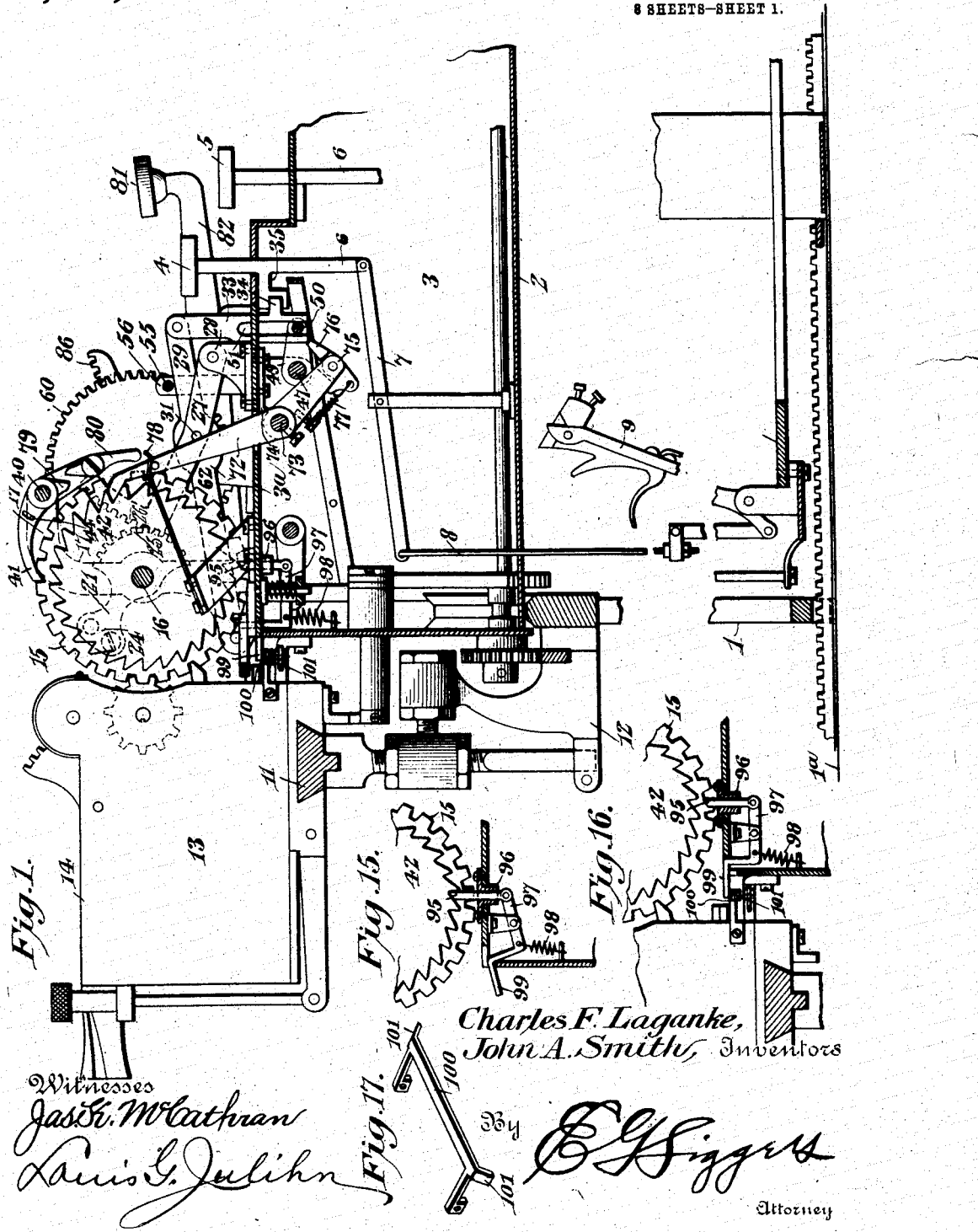

C. F. LAGANKE & J. A. SMITH.
MOTOR OPERATED ADDING MECHANISM.
APPLICATION FILED DEC. 30, 1905.

1,135,118.

Patented Apr. 13, 1915.
8 SHEETS—SHEET 2.

Charles F. Laganke,
John A. Smith,
Inventors

C. F. LAGANKE & J. A. SMITH.
MOTOR OPERATED ADDING MECHANISM.
APPLICATION FILED DEC. 30, 1905.
1,135,118.
Patented Apr. 13, 1915.
8 SHEETS—SHEET 3.
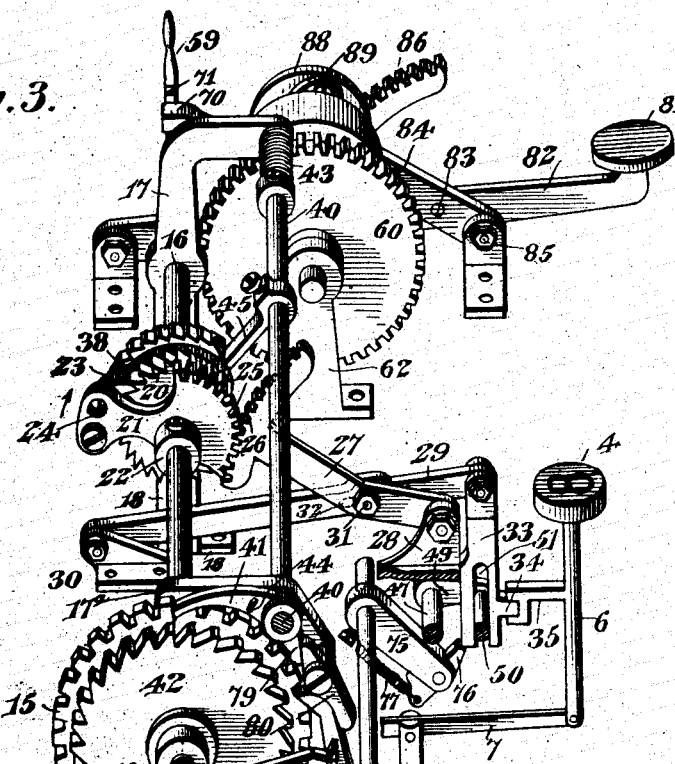
Fig. 3.
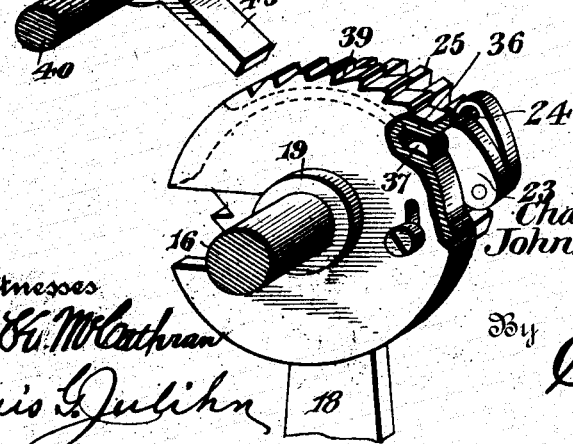
Fig. 3ª
Charles F. Laganke,
John A. Smith, Inventors
Witnesses C. F. LAGANKE & J. A. SMITH.
MOTOR OPERATED ADDING MECHANISM.
APPLICATION FILED DEC. 30, 1905.
1,135,118.
Patented Apr. 13, 1915.
8 SHEETS—SHEET 4.
Fig. 4.
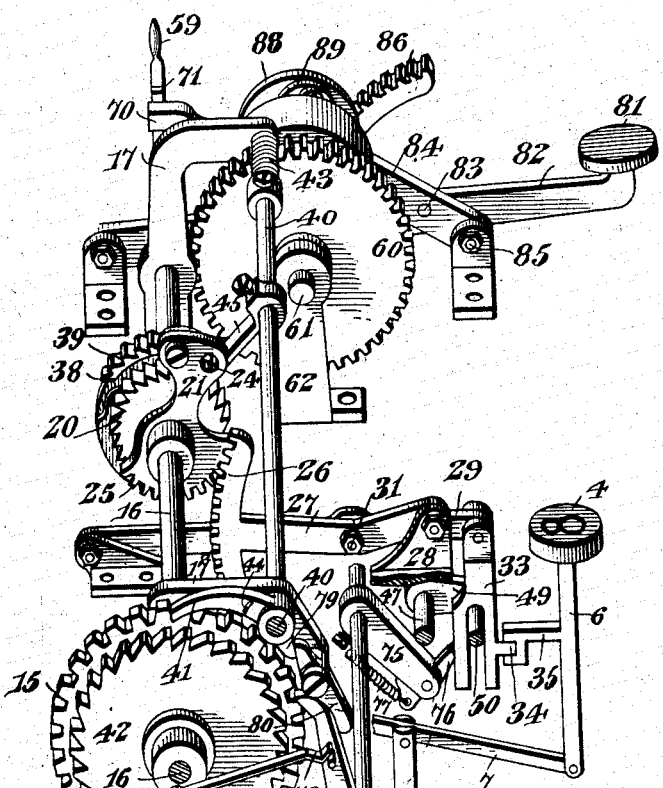
Fig. 4ᵃ
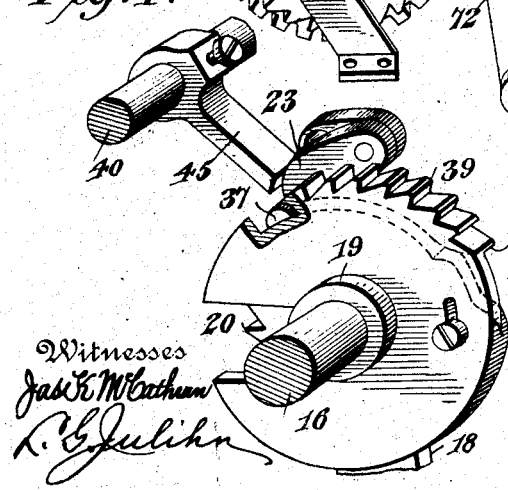
Charles F. Laganke,
John A. Smith, Inventors
Witnesses
Attorney Fig. 5.
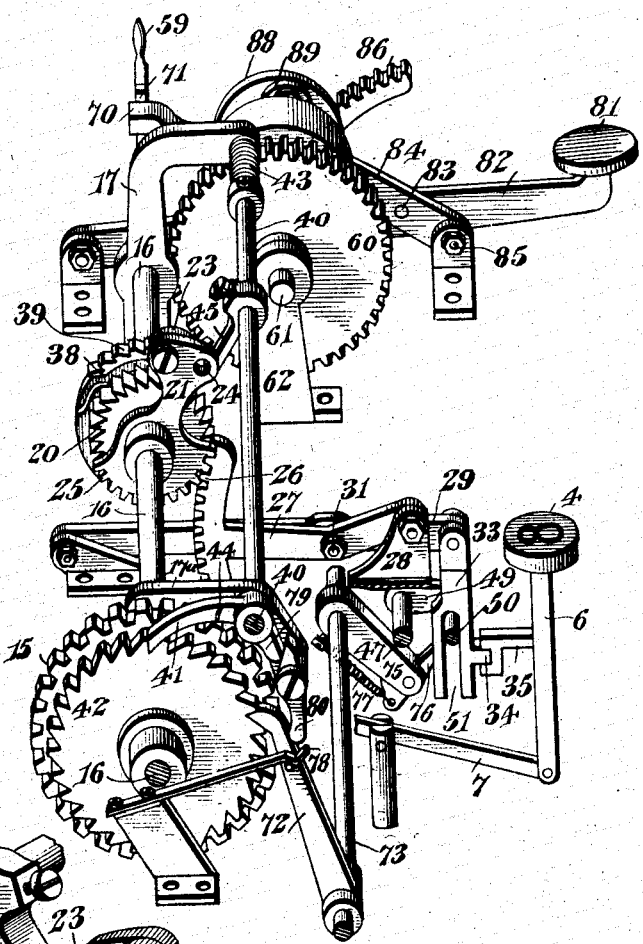
Fig. 5.ᵃ
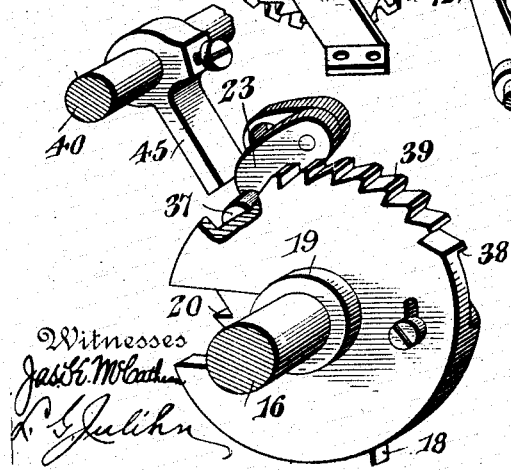
Charles F. Laganke,
John A. Smith, Inventors C. F. LAGANKE & J. A. SMITH.
MOTOR OPERATED ADDING MECHANISM.
APPLICATION FILED DEC. 30, 1905.

1,135,118. Patented Apr. 13, 1915.
8 SHEETS—SHEET 6.

Charles F. Laganke, Inventors
John A. Smith,

Witnesses

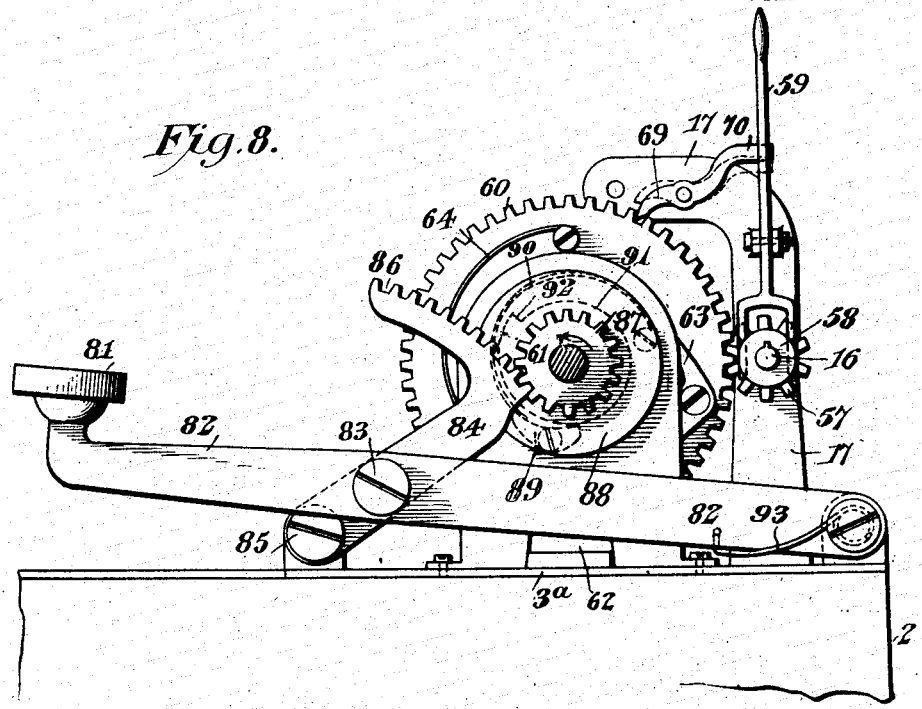
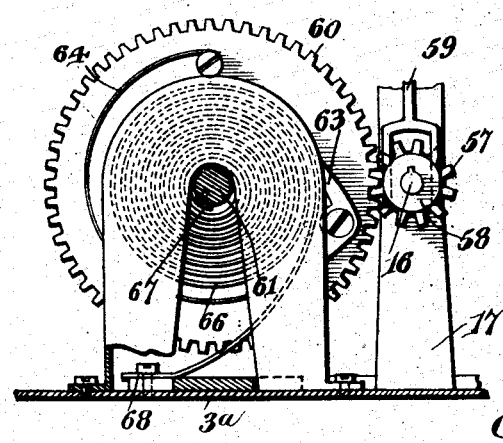 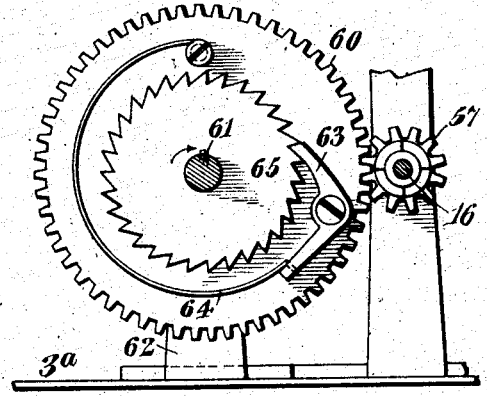

C. F. LAGANKE & J. A. SMITH.
MOTOR OPERATED ADDING MECHANISM.
APPLICATION FILED DEC. 30, 1905.
1,135,118.
Patented Apr. 13, 1915.
8 SHEETS—SHEET 8.
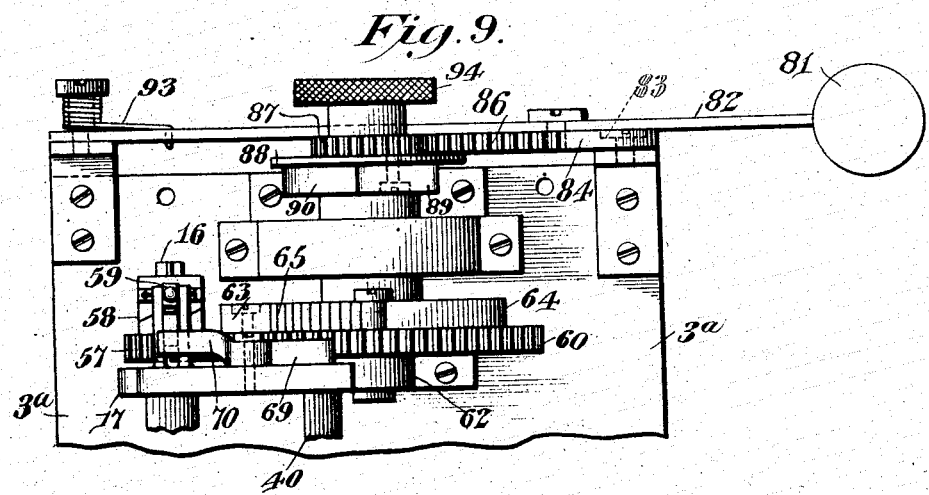
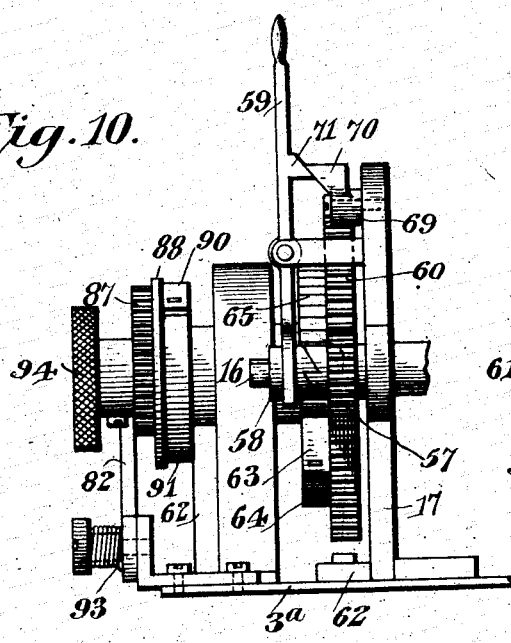
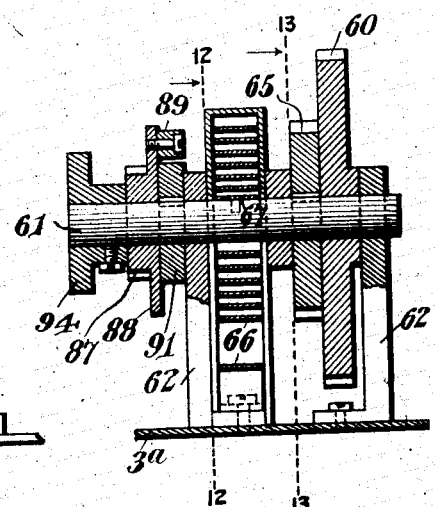
Charles F. Laganke,
John A. Smith, Inventors
Witnesses
Jas. F. McCathran
Louis G. Julihn
By
E. G. Siggers
Attorney

UNITED STATES PATENT OFFICE.

CHARLES F. LAGANKE AND JOHN ASBURY SMITH, OF HARRISBURG, PENNSYLVANIA, ASSIGNORS TO ELLIOTT-FISHER COMPANY, OF NEW YORK, N. Y., A CORPORATION OF DELAWARE.

MOTOR-OPERATED ADDING MECHANISM.

1,135,118.  Specification of Letters Patent.  Patented Apr. 13, 1915.

Application filed December 30, 1905. Serial No. 293,953.

*To all whom it may concern:*

Be it known that we, CHARLES F. LAGANKE and JOHN A. SMITH, both citizens of the United States, residing at Harrisburg, in the county of Dauphin and State of Pennsylvania, have invented a new and useful Motor-Operated Adding Mechanism, of which the following is a specification.

This invention relates to calculating machines, particularly to such as are combined with recording mechanism, and more especially to what is known in the art as a combined typewriting and calculating machine, the illustrated embodiment of the invention comprehending a machine including a flat platen or book typewriter as an adjunctive organization thereof.

It may be stated, by way of premise, that machines of the character to which our invention relates ordinarily include keys, the operation of which causes an operation of the computing mechanism corresponding to the value of the particular key operated. The mechanism whereby the keys cause the performance of these functions is varied, but ordinarily belongs to one of two distinct classes each of which has been the subject of more or less practical development. In machines of one type, the keys, when operated, actually transmit motion to the computing mechanism, the motive power being derived from the finger of the operator. The other type of machine is distinguished by a motor which drives the computing mechanism, but which is controlled by the keys, which are depressed by the finger of the operator to cause the operation of the computing device, but not to transmit motion thereto.

The primary object of our present invention is to produce a machine combining the advantages of both of the above described types, and having further advantages possessed by neither.

To this end, the actuating mechanism of the computing device is combined with a driving motor, with keys, and with intermediate connections, so related that motion may be transmitted to the actuating mechanism from the keys alone, from the motor alone, or from the keys and motor acting directly, but in conjunction.

Another object of the invention is to so organize the machine that both the recording and computing mechanisms may be operated by either the keys, the motor, or both.

To this end motion transmitting connections are established between the keys and the computing device and also between the keys and the recording mechanism, the arrangement of the motor being such that it may be thrown entirely out of action when it is desired to operate both the computing and recording mechanisms from the keys, or into action when it is desired to augment the power applied manually through the keys, or to convert the device for use as a motor operated, key controlled computing and recording mechanism.

A further object is to produce positively operating and absolutely reliable mechanism for controlling the motor operated movements of the actuating mechanism from the keys.

Another object is to produce efficient mechanism for restoring the energy expended by the motor, and various other objects, in addition to those enumerated, will appear more fully, as the succeeding description of the illustrated embodiment of the invention is developed.

Figure 2:
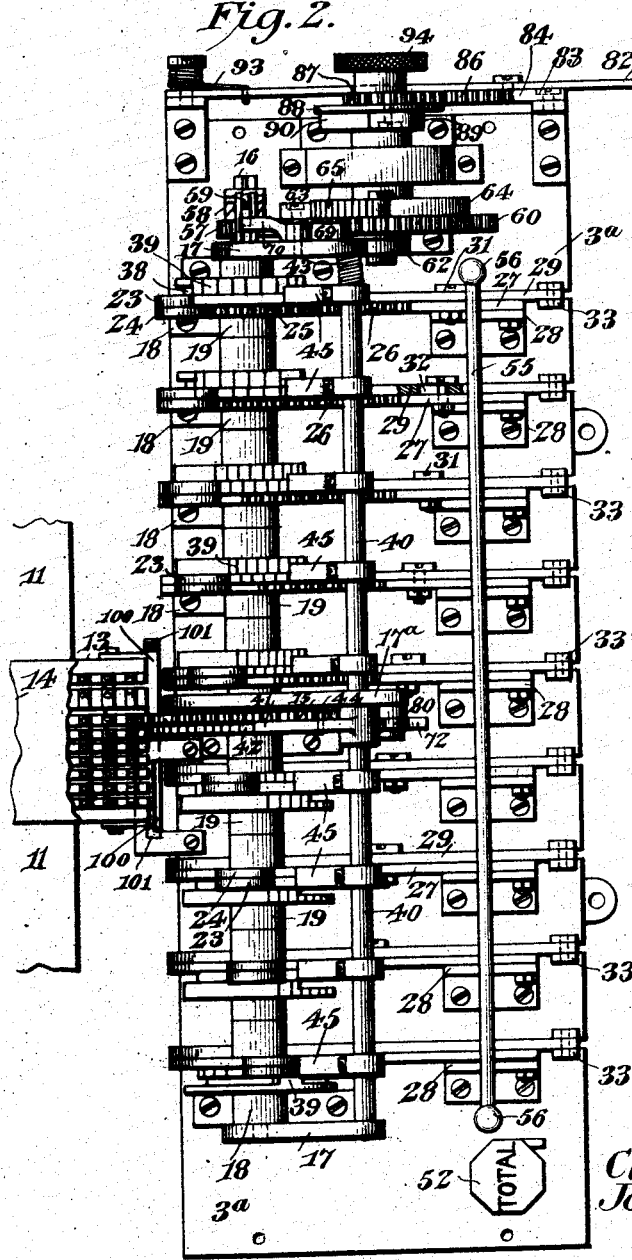
Figure 14:
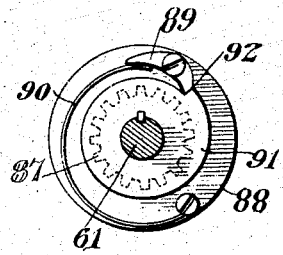
Figures 6, 7:
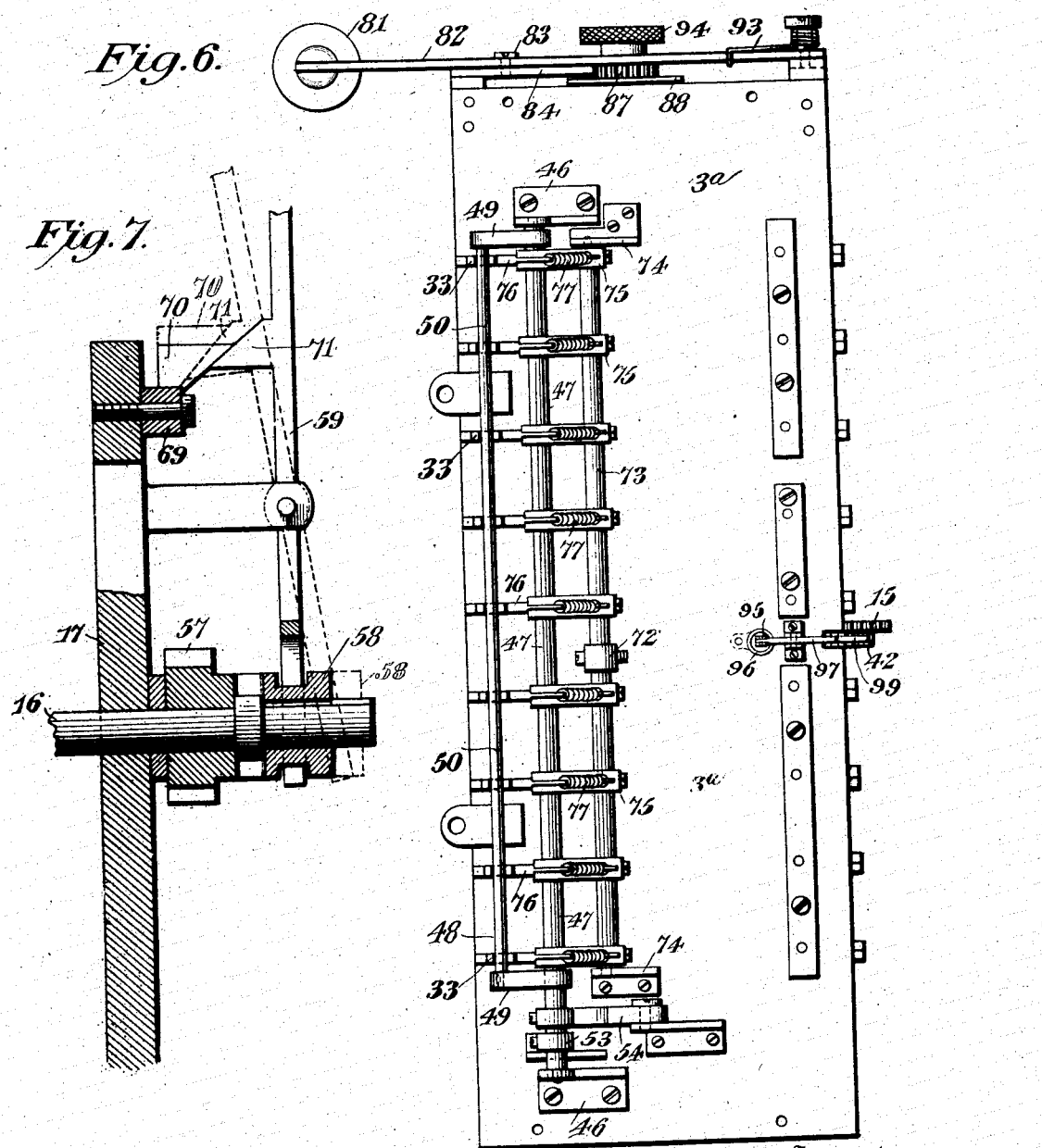

In the accompanying drawings—Figure 1 is a sectional view of so much of the machine as is necessary to show the general organization of the mechanism constituting the invention. Fig. 2 is a plan view of the cover-plate of the carriage, the parts assembled thereon, and a portion of the computing device and its support. Fig. 3 is a perspective view of a group of elements including the master wheel, the motor, one of the numeral keys, the mechanism for transmitting motion to the actuator from the key, and the master wheel controlling mechanism operated by the key, the parts being in the positions assumed after slight downward movement of the key. Fig. 3ª is a detail perspective view of the bearing bracket, driving arm and pawl, and the check bar, the positions of the parts corresponding to those indicated in Fig. 3 and portions of the structure being broken away to facilitate the illustration. Fig. 4 is a detail perspective view similar to Fig. 3, but showing the parts in the positions they assume just before the key reaches the limit of its downward movement. Fig. 4ª is a view similar to Fig. 3ª, but showing the parts in positions corresponding to those indicated in Fig. 4. Fig. 5 is another view similar to Figs. 3 and 4, but showing the parts in the positions they assume when the key has been fully depressed. Fig. 5ª is another view corresponding to Figs. 3ª and 4ª, but showing the parts in the positions indicated in Fig. 5. Fig. 6 is a bottom plan view of the cover-plate of the carriage and associated parts. Fig. 7 is a sectional view illustrating the construction and operation of the mechanism for throwing the motor into and out of action. Fig. 8 is an enlarged end elevation of the mechanism mounted on the carriage. Fig. 9 is a plan view of the motor, a portion of the actuator shaft, the intermediate connections, and the motor restoring or rewinding mechanism. Fig. 10 is a rear elevation of the structure shown in Fig. 9. Fig. 11 is a vertical section of the subject-matter of Fig. 10. Fig. 12 is a section on the line 12—12 of Fig. 11. Fig. 13 is a section on the line 13—13 of Fig. 11. Fig. 14 is a detail view of the mechanism for connecting the rewinding or restoring mechanism with the motor. Fig. 15 is a detail view, partly in section, of the master wheel locking mechanism. Fig. 16 is a similar view illustrating the manner in which the master wheel is automatically unlocked, and Fig. 17 is a detail view of the trip.

*The general organization of the typewriter.*—For the purpose of this disclosure the computing mechanism is shown combined with what is known to commerce as an Elliott-Fisher typewriter or billing machine, exemplified in Patent No. 573,868 to R. J. Fisher, to which reference may be made for a more complete disclosure of the typewriter construction than is thought to be necessary in the present connection.

The typewriter here shown embodies a machine frame 1 mounted to travel longitudinally of a flat platen 1ª to space the lines of writing. The frame 1 supports a carriage 2 carrying the printing mechanism and movable transversely of the platen to letter space the writing. The upper portion of the carriage 2 is in the form of a casing 3 above which are spaced the numeral keys 4 and the letter keys 5, having stems 6 connected at their lower ends to key levers 7 fulcrumed within the casing 3 and connected by draw-wires 8 with downwardly swinging type bars 9 mounted on a type ring 10 pendent from the carriage casing.

The carriage 2 is moved to the right by carriage propelling mechanism not shown, the step-by-step advance of the carriage for letter spacing being controlled by the usual escapement mechanism operatively related to the keys, which thus control the letter spacing movements of the carriage, it being understood that such movement takes place as the key rises after having been depressed to effect the printing of a character.

*The general relation of the computing device to the typewriting machine.*—In rear of the machine frame 1 a horizontal guide bar 11 is supported by brackets 12. On this bar 11 is slidably supported a computing device or register 13, which may be shifted along the bar and secured in position for use with respect to a column located at any point on the work sheet supported by the platen. The device 13 includes a casing 14 which contains the computing and registering mechanism, the specific character of which constitutes no part of the present invention. Suffice it to say that it includes as usual, a series of denominational members in the form of number wheels designed to register a series of denominational values, as for instance, hundredths, tenths, units, tens, hundreds, thousands, ten-thousands, hundred-thousands, and millions, the tenths wheel being of double width to accommodate the decimal space, see Fig. 2.

Each number wheel is provided upon its periphery with the digits 0 to 9 inclusive, preferably formed in or upon the end faces of the peripheral teeth, one digit of each wheel being observable through a sight opening. Each number wheel is arranged to make nine-tenths of a complete rotation independently of the other wheels of the series to present its digits successively before the sight opening, and during its next or tenth increment of movement, carries the next wheel to the left a single increment or step, after which the first named wheel may again rotate independently for nine-tenths of a complete rotation before again advancing the adjacent wheel to the left.

Since the wheels of the entire series are related to one another in the manner stated, it follows that mechanical computations in addition may be effected by moving the wheels, corresponding in order or denomination to the denominations of the digits composing the numbers to be added, a number of increments corresponding to the unitary values of such digits, the amount accumulated upon each wheel being automatically transferred to the wheel of next higher order when the limit of denominational value of the first named wheel is reached.

*The master wheel and its key operated driving connections.*—Upon the carriage 2 of the typewriting machine is mounted that portion of the computing mechanism which constitutes the operating means for the computing device proper, which, as we have seen, is mounted on the machine frame 1. The primary element of this actuating mechanism is a master wheel 15 presentable in position to operate successive denominational members, by the step-by-step advance of the carriage 2 in the direction of letter spacing. The master wheel is designed to rotate the denominational members or number wheels in proportion to the numerical values of the digits embraced by the computation. In the illustrated embodiment of the invention, the master wheel is key operated, and the operating keys are the numeral keys of the typewriter, although it is obvious that, viewing the invention as a calculating machine, regardless of the recording of the digits upon a work sheet or page, it is immaterial whether the keys perform any function other than the actuation of the master wheel.

The master wheel or actuator 15, see particularly Figs. 1, 2, 3, 4 and 5, is fixed upon a comparatively long actuator shaft 16 disposed parallel with the axes of the number wheels and supported by bearing brackets 17 rising from the cover-plate 3ª of the carriage casing 3. The shaft 16 is designed to be intermittently rotated in one direction exclusively, the degree of each rotation corresponding to the value of one of the numeral keys. The several keys 4 are each adapted to be independently connected to the actuator shaft by means of key connections, each of which is capable of transmitting movement to the shaft from a key while the connections of a key previously depressed are being retracted.

In addition to the brackets 17, a series of brackets 18 are secured to the cover-plate 3ª and correspond in number with the numeral keys, the upper portion of each bracket 18 surrounding the hub 19 of a driving ratchet 20 fixed to the actuator shaft. Immediately adjacent to each ratchet 20 is a comparatively short driving arm 21 loosely mounted on the actuator shaft and having a comparatively long hub 22 which preferably extends to the hub of the adjacent driving ratchet, see Fig. 2. The arrangement of the ratchets 20 and arms 21 is such that they alternate with each other upon the actuator shaft so that the driving arms, while free to swing relative to the shaft, are retained against lateral movement longitudinally thereof.

Each of the driving arms 21 is designed to move a different distance, since the movement of each corresponds in extent to the value of the key by means of which it is swung. These arms, therefore, have a graduated arrangement, as indicated in Fig. 2. At the outer end of each driving arm 21 is mounted a swinging driving pawl 23 which, when the arm is swung in the direction of the arrow in Fig. 3, is designed to engage a tooth of the adjacent driving ratchet 20 and thus establish an operative connection between the driving arm and the actuator so that the latter will be rotated a distance corresponding to the stroke of the arm. The width of the pawl 23 is slightly less than the distance between the driving arm and the adjacent bracket 18 and said pawl is spring-pressed toward the ratchet, the swinging movement of the pawl being limited by a stop pin 24 extending into an opening in the driving arm, as shown in Fig. 3. At the side of its axis opposite the pawl each driving arm is formed with a toothed segment 25 engaged by a toothed segment 26 formed at one end of a third class lever 27 fulcrumed at its opposite end in a bracket 28 secured to the cover-plate 3ª adjacent to the front edge thereof, the fulcrums of the several levers 27 being preferably arranged in alinement, see Fig. 2.

Each lever 27 is designed to be operated, for the purpose of swinging its driving arm, by a second class lever 29 fulcrumed at its rear end in a bearing bracket 30 mounted at the rear edge of the cover-plate 3ª. The levers 29 are connected at their front ends to the numeral keys for actuation by the latter and an operative connection between each lever 27 and the adjacent lever 29 is effected by means of a pin 31 extended laterally from one lever and playing within a comparatively short longitudinal slot 32 in the other lever. In other words, a slot and pin connection is effected between each pair of levers at a point intermediate of their ends. As the stroke of each key, regardless of its value, is the same, and since a positive connection is effected between each key and one of the levers 29, it follows that each lever 29 will have the same extent of movement or stroke, and, as it is necessary for the several levers 27 to have differential movement according to the progressive value of the keys, the several slot and pin connections are disposed in graduated arrangement, as best shown in Fig. 2. By this arrangement the stroke of the lever 27 operated by the "1" key will be one-ninth of the stroke of the lever 27 operated by the "9" key, notwithstanding the fact that both of the levers 29 operated by the "1" and "9" keys respectively, will have exactly the same stroke, the levers 27 intermediate of those just referred to having strokes proportionate to the values of the intermediate keys.

Pendent from the front end of each lever 29 is a link 33 extending through the cover-plate 3ª and provided at a point below said plate with a projection 34 designed to normally engage a recessed pin 35 projecting from the stem of the adjacent numeral key. A positive connection is thus established between each key and one of the operating connections of the computing device so that the key and connection will move in unison during both the operating and retractile movements of the parts.

When a given key is depressed, the driving arm 21 connected thereto will be swung in the direction of the arrow in Fig. 3, and its pawl, engaging the adjacent fixed ratchet 20, will rotate the actuator shaft and the master wheel fixed thereon for the purpose of rotating that number wheel with which the master wheel is in operative relation, a number of increments corresponding to the unitary value of the key. When the key is released its connections will be retracted without effecting reverse rotation of the actuator shaft, since it will be obvious that the driving arm will swing back to its initial position independently of the ratchet previously engaged by its pawl.

To prevent the driving arm from swinging back before it has completed a full forward stroke, which obviously would result in falsifying the computation, each of the brackets 18 is provided with a segmental guard flange 36 concentric with the actuator shaft 16. Under this flange 36 a lateral projection or dog 37 carried by the pawl 23 is designed to ride when a driving arm is swung to operate the master wheel. This flange 36 performs several functions. In the first place, its rear extremity is reversely curved to form a cam 38 which, when engaged by the dog 37, will positively urge the latter into engagement with a tooth of the adjacent driving ratchet 20. After the engagement of the pawl and ratchet has been effected, the flange 36 constitutes a guard positively preventing accidental disengagement of the pawl from the ratchet until the full stroke is completed and thus preventing the retraction of the key connection in the event of an incomplete key stroke.

The flange 36 also serves to prevent reactuation of a key connection until the retractile movement of the latter from a previous operation has been completed. The outer face of the flange 36 is formed with ratchet teeth 39. When a driving arm reaches the limit of its operating movement, the projection or dog 37 on its pawl will have passed beyond the front end of the flange 36, and, as the arm begins its retractile movement, the pawl will necessarily ride up the inclined face of the ratchet tooth in rear of the one engaged by it, and the outward movement of the pawl thus produced will cause the dog 37 to ride up over the front end of the flange 36. As the driving arm now moves back, the dog, instead of traversing the under side of the flange, as before, will ride over the flange, being dogged during such movement by the teeth 39. It will, therefore, be impossible to reactuate the driving arm until its retractile movement has been completed.

To prevent overrunning of the master wheel, a universal check bar 40 is afforded bearings in the forwardly extended upper ends of the brackets 17. Extended rearwardly from this bar is a swinging check arm 41 designed to move into engagement with a ratchet wheel 42 fixed to the actuator shaft 16 d preferably also rigidly attached to .e side of the master wheel or actuator 15. Normally the check arm 41 is held out of engagement with the ratchet wheel 42 by a spring 43 encircling the bar 40 adjacent to one end thereof and tending to rock the same in one direction, the outward or upward movement of the check arm being limited by a stop 44.

Extended radially from the universal bar 40 are a series of arms 45 each of which is arranged to be engaged by one of the driving arms 21 as the latter reaches the limit of its movement. Thus, when a key is depressed, the driving arm will swing for the purpose of rotating the master wheel, and immediately before said driving arm reaches the limit of its movement, it will engage one of the arms 45 and swing the latter from the position shown in Fig. 4 to that in Fig. 5, thereby rocking the universal bar and swinging the check arm 41 into engagement with the ratchet wheel 42 to positively check the master wheel at the proper point and thus prevent overrunning thereof. As the driving arm moves back, upon the release of the key, the spring 43 restores the check bar to its normal position and withdraws the check arm 41 from engagement with the ratchet wheel 42. Therefore, as soon as the driving arm has moved back the very slight distance necessary to effect the release of the master wheel, the latter may be operated by another key without awaiting further retractile movement of the key previously depressed.

Pendent from the under side of the cover-plate 3ª are a pair of brackets 46, see Fig. 6, in which is journaled a rock shaft 47 carrying a yoke 48 comprising a pair of arms 49 and a universal bar 50. The universal bar 50 is received within vertical slots 51 in each of the links 33, these slots being of sufficient length to accommodate the normally stationary universal bar when the links are reciprocated vertically during the operation of the key connections, the bar thus serving to guide the links in their movement and to prevent their accidental disengagement from the key stems. In addition to this function as a guide, the bar 50 may be shifted laterally from its normal position for the purpose of swinging the several links 33 out of engagement with the pins 35 on the key stems when it is desired to render the numeral keys independent of the computing device connections. This movement of the bar may be and preferably is effected by means of a total key 52, the stem 53 of which is connected to the shaft 47 to permit the shifting of the key to rock the yoke 48 and thus cause the universal bar 50 to move the links 33 into or out of engagement with the pins on the key stems. The yoke is held in either position by a detent 54, indicated generally in Fig. 6. To prevent undue upward movement of the levers 29 when the links are released from the key stems, a universal stop bar 55 is disposed across the front ends of said levers and is supported upon standards 56 rising from the plate 3ª.

The mechanism thus far described, while capable of effective use without the addition of other elements, is not claimed herein, except in combination with additional mechanism to be hereinafter described. It has been necessary, however, to describe this mechanism in detail because it constitutes that part of the machine organization whereby motion may be transmitted to the master wheel from the numeral keys, and, as has already been stated, this invention is directed to the production of a machine wherein the computing device may be operated either from the keys alone, from a motor capable of supplying the necessary motive power, or from both the keys and motor acting conjointly, the keys constituting prime movers for the actuator, and the motor serving to assist and thus minimize the burden upon the keys.

*The motor.*—Mounted on the actuator shaft 16 beyond one of the brackets 17 is a loose pinion 57 designed to be connected to the shaft when desired by a clutch 58 operated by a clutch lever 59, see Figs. 7, 8, 9 and 10. The pinion 57 is enmeshed with a comparatively large motor gear 60 loosely mounted on a comparatively short motor shaft 61 journaled in bearing brackets 62 rising from the cover-plate 3ª. The motor gear 60, see Figs. 12 and 13, is provided upon the outer side face thereof with a pivoted pawl 63 urged by a spring 64 into engaging relation with what may be termed the motor ratchet 65 fixed in any suitable manner on the motor shaft 61. The motor shaft 61 is urged in the direction of the arrow in Fig. 13 by a motor spring 66 of spiral form, one end of said spring being attached to the shaft 60, as indicated at 67, and the other end of the spring being attached at 68 to a fixed part, as for instance, the plate 3ª. It will be seen, therefore, that the motor spring 66 drives the motor shaft 61 in the direction of the arrow in Fig. 13, and that the ratchet wheel 65 fixed on the shaft engages the pawl 63 and through the medium thereof drives the motor gear 60, which in turn drives the pinion 57 and rotates the actuator shaft 16 and the actuator 15. The provision of the clutch 58 makes it possible, however, to throw the motor entirely out of action by disconnecting the pinion 57 from the actuator shaft and thus permit the computing and recording mechanism to be operated wholly by the power derived from the fingers of the operator as the numeral keys of the typewriter are manipulated.

When the clutch 58 is in this released or unclutched position, shown in dotted lines in Fig. 7, the motor gear is held against rotation by a locking lever or detent 69 fulcrumed on one of the brackets 17, see Fig. 8, and having its rear end provided with a cam 70 engaged by a cam projection 71 on the clutch lever 59, see Figs. 7 and 10. When the clutch lever 59 is moved to the dotted position in Fig. 7, it disconnects the clutch 58 from the pinion 57 and at the same time forces the cam projection 71 on the clutch lever under the cam end 70 of the locking lever 69, thus swinging the latter into engagement with the motor gear 60 to hold the same locked as long as the connection between the motor and the actuator shaft remains broken.

*The actuator controlling mechanism.*—Assuming that the clutch 58 is in its engaged position and that the lever or detent 69 is in its disengaged position, shown in dotted lines in Fig. 8, the motor will obviously tend to rotate the actuator shaft and if sufficiently powerful, will actually rotate the master wheel prior to the depression of a key, in the absence of special provision for the normal retention of the actuator shaft. We therefore provide key operated controlling mechanism including a locking arm 72, see Fig. 1, normally engaging the ratchet wheel 42 to prevent premature rotary movement of the actuator. The locking arm 72 is fixed to a rock shaft 73 journaled in bearing brackets 74 depending from the under side of the plate 3ª, see Figs. 1 and 6. To this shaft 73 are also secured a series of releasing arms 75 corresponding in number with the numeral keys of the typewriter. The arms 75 are downwardly and forwardly inclined and each is provided at its front end with a pivoted contact block 76 disposed in the path of one of the links 33 and yieldingly held in its normal position by a spring 77, see Figs. 1 and 3. The locking arm 72 is yieldingly retained in both its engaged and disengaged positions by a spring detent 78, see Figs. 1 and 3.

When one of the numeral keys is depressed, the initial portion of its movement serves to cause the link 33 connected thereto to swing one of the arms 75 by engagement with the contact block 76 mounted thereon. This movement of the arm 75 rocks the shaft 73 sufficiently to withdraw the locking arm 72 from the ratchet 42. When this has been accomplished, the swinging of the arm 75 will have withdrawn the block 76 out of the path of the link 33 and the latter will therefore continue its downward movement independently of the block to effect the operation of the master wheel.

We have already seen that as a driving arm 21 completes its movement, it operates the check bar 40 to throw the check arm 41 into engagement with the wheel 42 to arrest the master wheel at the proper time. It is, therefore, desirable to utilize this movement of the check arm to throw the locking arm 72 into engagement with the wheel 42 so that, when the check arm 41 moves away from the wheel it will leave the latter locked by the arm 72 until again released by the operation of a key. To accomplish this result, the check arm 41 is provided with a tail-piece 79 coöperatively related to one end of a small lever 80 fulcrumed on a bracket 17ª similar to the bracket 17 but extended to provide for the support of the lever 80, see Figs. 1 and 2. When the locking arm 72 is swung back to its released position, it engages the lower end of the lever 80 and swings the same to present the upper end thereof in engagement with the tail-piece 79 of the check arm 41, see Fig. 3. Therefore, when the check arm is swung into engagement with the wheel 42 to check the master wheel, the tail-piece 79 on said arm will swing the lever 80, which will move the locking arm 72 to its engaged position, see Fig. 5, and when the retraction of the driving arm permits the check arm to move out of engagement with the wheel 42, the locking arm 72 will remain in engagement with said wheel and the parts will reassume the normal positions shown in Fig. 1.

From this statement of operation, the necessity for the provision of the pivoted blocks 76 will be apparent, since it will be seen that the movement of the locking arm 72 to its engaging position takes place while a key and a link 33 are depressed and while the end of a block 76 is in engagement with the side of the link. Necessarily therefore, the block 76 must be made to yield in order to allow the necessary movement of the arm 75, which moves with the locking arm.

*The motor rewinding mechanism.*—For the purpose of restoring the energy expended by the motor 66, we provide a motor key 81 carried by a key lever 82 fulcrumed at its rear end, as shown in Fig. 8, and suitably connected at 83 with a lever 84 fulcrumed at one end as indicated at 85 and provided with a segmental rack 86 at its opposite end. The rack 86 is enmeshed with a pinion 87, preferably formed integral with a disk 88 rotatably mounted on the motor shaft 61 and provided upon the inner side face thereof with a pawl 89. The pawl 89 is urged by a spring 90 toward the periphery of a cam 91 fixed on the motor shaft 61 and formed with a shoulder 92. Normally the pawl 89 and the shoulder 92 of the cam 91 occupy approximately the relative positions indicated by dotted lines in Fig. 8. When the motor is operated, however, the cam 91 being fixed to the motor shaft, will rotate with the latter and the shoulder 92 will therefore approach the pawl 89 which will remain stationary. The gearing between the motor shaft and the master wheel is so proportioned, however, that the several number wheels of the computing device may be operated by the motor before the shoulder 92 on the cam 91 reaches the position occupied by the pawl 89. When it is desired to rewind the motor, it is simply necessary to depress the motor key 81, which, through the intermediate connections, will swing the rack 86 downward and thus rotate the pinion 87 and the disk 88 in the direction indicated by the arrow in Fig. 8. This movement of the disk 88 will present the pawl 89 to the shoulder 92 of the cam 91, a positive connection being thus established between the pinion 87 and the motor shaft. Continued depression of the key 81 will effect the reverse rotation of the motor shaft 61 to its normal position, thus rewinding the spring 66 and presenting the shoulder 92 of the cam 91 in the position shown in Fig. 8. Upon the release of the key 81, the latter, together with the lever 84, the pinion 87, disk 88, and pawl 89, will be restored to their normal positions, shown in Fig. 8, by a spring 93 acting on the lever 82.

In addition to the motor key 81, which is intended to restore the power expended by the motor spring 66 in the operation of the mechanism, we provide the motor shaft with a knob 94 to facilitate the winding of the spring in the first instance, since it is intended to vary the extent to which the motor spring is wound, accordingly as it is desired to utilize the motor merely as an assistance to the power derived from the finger of the operator or as the sole source of motive power to be applied to the actuator.

*The means for locking the master wheel when disengaged from the computing device.*—It will be noted that unless provision is made to the contrary, the printing of a digit outside of the column to be computed would result in the release of the master wheel and the operation of the motor, assuming, of course, that the total key had not been operated to wholly disconnect the keys from the operating mechanism of the computing device. Such operations of the motor may be permitted for the purpose of assisting in the operation of the printing mechanism, but it is perhaps desirable to prevent the motor from operating and expending its energy, except when it is desired to operate both the printing and computing mechanisms. For this reason we provide means for locking the master wheel whenever the latter is out of engagement with the computing device and for automatically releasing the master wheel whenever it comes into position to operate a denominational member or number wheel, (see Figs. 1, 2, 6, 15, 16 and 17).

Disposed to engage the ratchet wheel 42, which is fixed relative to the master wheel, is a locking rod 95 mounted to slide in a suitable bearing 96 in the top of the carriage casing 3 and connected at its lower end (see Fig. 15) to a lever 97 suitably fulcrumed in the casing and normally urged by a spring 98 to move the locking rod 95 into engagement with the wheel 42. The rear end 99 of the lever 97 projects rearwardly from the casing 3 and moves with the typewriter carriage in a path obstructed by a trip 100 mounted independently of the carriage and preferably secured to or formed integral with the casing of the computing device 13, (see Figs. 1, 2 and 17). The trip 100 has inclined ends 101 which act as cams, serving to elevate the rear end of the lever 97 and thus withdraw the locking bar 95 from the wheel 42 to unlock the master wheel when the latter moves opposite the computing device from either side thereof. Thus it will be noted that while the locking bar 95 is held in its depressed or inactive position as long as the master wheel is opposite the computing device, it will automatically lock the master wheel whenever the latter moves out of engagement with the computing device, so that, should a numeral key be struck, the power of the motor will not be uselessly expended, although if the operator desires to write a numeral outside of the column, he may do so by operating the total key to release the numeral keys.

*A general review.*—Assuming that the parts are positioned as indicated in Fig. 1, and that the motor has been wound sufficiently to enable it alone to drive the actuator shaft and the parts which necessarily move therewith, the operation is as follows: The operator, by exerting slight pressure on a numeral key 4, will cause a driving arm 21 to swing sufficiently to cause the dog or projection 37 associated with the adjacent driving pawl 23 to move under the flange 36 on the adjacent bracket which will cause the pawl to engage the adjacent driving ratchet 20. While this slight initial movement of the driving arm is taking place, the actuator shaft 16 will be released by the withdrawal of the locking arm 72 from the wheel 42 in consequence of the operation of one of the arms 75 by the link 33 connected to the key upon which the pressure is exerted. The positions assumed by the parts upon this slight initial depression of a key is shown in Fig. 3 of the drawings.

As soon as the actuator shaft is released, it being observed that the release is effected manually, the shaft will be rotated by the motor in the direction of the arrow in Fig. 3, and the motor will thus serve to drive the master wheel and a denominational member of the computing device and to simultaneously advance a type arm 9 to the platen. This operation of the type arm will be effected for the reason that the driving pawl 33 will be held securely in engagement with the driving ratchet 20 by reason of the coöperative relation of the projection 37 and the flange 36, and therefore, as the driving ratchet rotates with the motor driven actuator shaft, the driving arm will be carried around with it, and, through the intermediate connection, will depress the key and operate the type arm connected therewith. It will be observed, however, that no key, except the one which has been depressed to release the actuator shaft, will be affected by the operation of the motor, because the driving pawls of the driving arms appropriated to the other keys will be located in rear of and out of coöperative relation with the adjacent guard flanges and will therefore permit the associated driving ratchets to rotate independently of the pawls as the actuator shaft is driven. In other words, the initial depression of a key establishes a coöperative relation between the actuator shaft and the driving arm appropriated to that key and releases the shaft to permit the motor to operate the master wheel and the particular driving arm so selected.

When the master wheel has rotated a given distance, the driving pawl will engage one of the arms 45 on the universal check bar 40 and the parts will then have assumed the positions shown in Fig. 4. Continued movement of the parts will cause the arm 45 to be swung forward thus rocking the check bar 40 to present the check arm 41 in engagement with the wheel 42 for the purpose of positively arresting the mechanism when the master wheel has rotated a distance proportionate to the value of the particular key depressed. As the check arm moves into engagement with the wheel 42, its tail-piece 79 operates the lever 80 which throws the locking arm into engagement with the wheel 42. When this operation of the parts occurs, the key is fully depressed, a digit is printed, the computing device has been operated to accumulate the value of the printed digit thereon, and the parts will have assumed the positions shown in Fig. 5. Upon the release of the key, the parts return to their normal positions, shown in Fig. 1, the locking arm 72 holding the master wheel securely locked until a repetition of the foregoing operation is inaugurated by the partial depression of the same or another key.

If the motor is not wound sufficiently tight to alone operate the parts, it is simply necessary for the operator to operate the key as before described, to release the master wheel and establish a coöperative relation between a driving arm and the actuator shaft, and to thereafter maintain such pressure upon the key as will sufficiently augment the force exerted by the motor to effect the operation of the master wheel. In such event, both the motor and the key will constitute driving means for the actuator or master wheel, as well as for the printing mechanism. In other words, both the computing and recording mechanism will be key operated, but the motor will render sufficient assistance to materially lighten the touch.

We have now seen that it is within the capability of the machine to have the computing and recording mechanism operated by the motor alone and controlled by the keys, or operated conjointly by the keys and motor. It remains, therefore, to direct attention to the fact that the computing and recording mechanism may be arranged for operation by the keys alone, since the motor may be entirely disconnected from the actuator shaft by manipulating the clutch lever 59 to disengage the clutch 58 from the pinion 57. In fine, the arrangement of the described mechanism is such that the computing and recording mechanisms may be operated by power derived solely from either the keys or the motor or by power derived conjointly from the motor and keys, the keys serving under all conditions as manually operated selecting devices for determining the digit to be printed and the degree of movement of the actuator.

It is thought that from the foregoing description, the construction and operation of the various mechanisms included in the machine organization will be apparent. It should be understood, however, that many features of the invention may be embodied in machines other than that selected for illustrative purposes, and the right to effect such changes, modifications, and variations as may come within the scope of the protection prayed is accordingly reserved.

What we claim is:—

1. The combination with a computing device, of a motor and a numeral key, both arranged to transmit motion to the computing device.

2. The combination with a motor and a numeral key, of a computing device arranged to be operated by either the motor or the key.

3. The combination with a computing device, of an actuator therefor, a series of keys for operating the actuator, and an actuator driving motor.

4. The combination with a computing device, of an actuator therefor, a series of keys for operating the actuator, a motor disconnected from the actuator, and means for establishing a coöperative relation between the motor and actuator when desired.

5. The combination with a computing device, of an actuator therefor, a series of keys of different values, means for effecting a driving connection between any one of said keys and the actuator, a motor connected to the actuator, and means for limiting the movement of the actuator in accordance with the value of the particular key connected thereto.

6. The combination with a computing device, of an actuator therefor, a series of keys of different values, means operative upon the initial movement of any one of said keys to effect a driving connection between said key and the actuator, a motor connected to the actuator, and means operated by an element of the connection between the key and the actuator for arresting the latter at the completion of a movement corresponding to the value of the key.

7. The combination with a computing device, of a master wheel therefor, a master wheel shaft, a series of keys, a corresponding series of driving arms operatively connected to the keys, means operated upon the initial movement of a driving arm to operatively connect the same to the master wheel shaft, and a motor connected to the shaft.

8. The combination with a computing device, of a master wheel therefor, a master wheel shaft, a series of keys, a corresponding series of driving arms operatively connected to the keys, means operated upon the initial movement of a driving arm to operatively connect the same to the master wheel shaft, a motor connected to the shaft, and means for disconnecting the motor from the shaft.

9. The combination with a computing device, of a master wheel therefor, a master wheel shaft, a motor connected to the shaft, a series of driving arms mounted to swing from the shaft, pawl and ratchet mechanism for connecting the driving arms with the shaft, a series of keys, operative connections between the keys and the driving arms, and a check device arranged to be operated by either of the driving arms to arrest the movement of the master wheel.

10. The combination with a computing device, of a master wheel, a motor therefor, a series of keys, means for effecting a driving connection between either of said keys and the master wheel, and a key operated locking device for the master wheel.

11. The combination with a computing device, of a master wheel therefor, a motor for the master wheel, a series of keys, a locking device for the master wheel, and mechanism operated upon the initial movement of a key to connect the key with the master wheel and to release the latter.

12. The combination with a computing device, of a master wheel therefor, a master wheel motor, a locking device normally preventing movement of the master wheel, keys arranged to move the locking device to release the master wheel, and means movable with the master wheel for returning the locking device to its normal position.

13. The combination with a computing device, of a master wheel therefor, a master wheel motor, a series of keys, a key operated locking device for the master wheel, key operated means for connecting either of said keys with the master wheel, a graduated series of devices movable with the master wheel, and means adapted to be operated by either of said devices to effect the locking of the master wheel at the completion of a movement corresponding to the value of one of the keys.

14. The combination with a computing device, of a master wheel therefor, a master wheel shaft, a motor connected to the shaft, a series of driving ratchets mounted on the shaft, a series of oscillatory driving arms mounted on the shaft, driving pawls carried by the arms, means operated upon the initial movement of a driving arm for engaging its pawl with the adjacent driving ratchet, a universal check bar arranged to be operated by either of the driving arms, a check arm movable by the check bar to arrest the master wheel, a series of keys, a driving connection between each key and a driving arm, a locking arm normally holding the master wheel against movement and arranged to be moved by either of the keys to release the master wheel, and means movable with the universal check bar for restoring the locking arm to its normal position.

15. The combination with computing mechanism and recording mechanism, of a motor and a numeral key having driving connection with both of said mechanisms.

16. The combination with a motor and a numeral key, of computing mechanism and recording mechanism both arranged to be operated by either the motor or the key.

17. The combination with a computing device, an actuator therefor, and recording mechanism, of a driving motor common to the recording mechanism and actuator, a series of operating keys for the recording mechanism, and means for establishing a driving connection between either of said keys and the actuator.

18. The combination with a computing device and an actuator therefor, of recording mechanism, a series of operating keys therefor, means for establishing a driving connection between either of said keys and the actuator, a driving motor common to the recording mechanism and actuator, and means for throwing the motor into and out of action.

19. The combination with a computing device, of an actuator therefor, a motor for the actuator, recording mechanism, a series of keys normally connected to the recording mechanism and disconnected from the actuator, and key operated means for establishing a driving connection between either of said keys and the actuator and for determining the degree of movement of said actuator.

20. The combination with a computing device, of an actuator therefor, an actuator shaft, a motor connected to said shaft, a graduated series of driving arms mounted on the shaft, means operative upon the initial movement of a driving arm to positively connect the latter with the shaft, a series of numeral keys, digit printing devices connected with the keys, driving connections between the keys and the respective driving arms, a locking device normally holding the actuator against movement and adapted to be withdrawn from its locking position by the movement of any one of the several keys, a universal check device arranged for operation by any one of the several driving arms to check the actuator at the proper time, and means operated by the check device for restoring the locking arm to its normal position.

21. The combination with a typewriting machine, of a computing device and a master actuator having their denominational relation controlled by the numeral keys of the typewriter, a motor connected with the actuator to operate or assist in the operation of the same, and mechanism for operatively connecting the numeral keys of the typewriter with the actuator to operate or assist in the operation thereof.

22. The combination with a typewriter, of a computing device, and operating mechanism therefor including a motor mounted on the typewriter carriage.

23. The combination with a typewriter, of a computing device, and operating mechanism therefor mounted on the typewriter carriage and including a motor.

24. The combination with a typewriter, of a computing device stationary relative to the typewriter carriage, and actuating mechanism for the computing device including an actuator and a motor therefor, both movable with the typewriter carriage.

25. The combination with a typewriter, of a computing device, an actuator therefor movable with the typewriter carriage, a driving motor for the actuator, and mechanism whereby the operating movements of the actuator are controlled by the numeral keys of the typewriter.

26. The combination with a typewriting machine, of a computing device stationary relative to the typewriter carriage, a master actuator movable with the typewriter carriage, a motor, and mechanism whereby the actuator may be operated by the typewriter keys or the motor, or by the keys and motor conjointly.

27. The combination with a typewriting machine including a movable carriage, and numeral keys and printing mechanism movable therewith, of a computing device, a master actuator therefor, an operating motor for the actuator, and key operated means controlling the movement of the actuator.

28. The combination with a typewriting machine including a movable carriage, and numeral keys and printing mechanism movable therewith, of a computing device, an actuator therefor, a motor adapted to be connected with the actuator, and means for establishing a driving connection between the numeral keys of the typewriter and the actuator.

29. The combination with a typewriter including a movable carriage, and numeral keys and printing mechanism movable therewith, of a computing device, a master actuator therefor mounted on the typewriter carriage, a motor also mounted on the typewriter carriage and adapted to be connected with the actuator, and means whereby the initial depression of any numeral key of the typewriter will release the actuator and determine the extent of movement thereof.

30. The combination with a typewriting machine including a movable carriage, and numeral keys and printing mechanism movable therewith, of a computing device, a normally locked master actuator therefor mounted on the typewriter carriage, a motor also mounted on the carriage and adapted to be connected to the actuator, and means operative upon the initial movement of any numeral key to establish a driving connection between said key and the actuator and to release said actuator.

31. The combination with a typewriting machine including a movable carriage, and numeral keys and printing mechanism movable therewith, of a computing device, a normally locked master actuator therefor mounted on the typewriter carriage, a motor also mounted on the carriage and adapted to be connected to the actuator, means operative upon the initial movement of any numeral key to establish a driving connection between said key and the actuator and to release said actuator, and means for arresting and locking the actuator upon the completion of its movement.

32. The combination with a typewriter including numeral type bars and numeral keys, of a computing device including a series of denominational members, a master actuator for the computing device, a driving motor common to the master actuator and to the type bars, and means operated by the numeral keys for determining which of the type bars will be operated by the motor and the extent of movement of the actuator.

33. The combination with a computing device, of a motor therefor, a clutch controlling the connection between the computing device and motor, and means for automatically locking the motor when the clutch is operated in one direction.

34. The combination with a computing device, an actuator therefor, and an actuator shaft, of a motor, a motor gear driven by the motor and geared to the actuator shaft, a locking device for the motor gear, a clutch controlling the connection between the motor gear and the actuator shaft, and an operating device common to the clutch and locking device.

35. The combination with a computing device and an actuator therefor, said device and actuator being relatively movable to present them in or out of coöperative relation, of automatic means for locking the actuator when the latter is disposed out of coöperative relation with the computing device and for releasing the actuator when the latter is disposed in position to operate the computing device.

36. The combination with a computing device and a rotary actuator, the computing device and actuator being relatively movable to present them in or out of coöperative relation, of means for locking the actuator against rotary movement, said means being controlled by the relative movement of the actuator and computing device.

37. The combination with a computing device, and a rotary actuator relatively movable, of a locking device for the actuator, and a trip controlling the operation of said device and in turn controlled by the relative movement of the computing device and actuator.

38. The combination with a computing device, of a motor and a key both having driving connection with the computing device, me ns normally restraining the operation of the motor, and means operative upon the actuation of the key to release the motor.

39. The combination with a computing device, of a manually operated key-mechanism and a motor, adapted to act simultaneously to operate the computing device.

40. The combination with a computing device, of a key, a driving connection arranged to transmit motion to the computing device from the key, and a motor operating during the actuation of the key to assist in operating the computing device.

41. The combination with a computing device, of manually operated means and power operated means adapted to act simultaneously to operate the computing device.

42. The combination with a key and a motor, of a computing device adapted to be driven by the motor alone or by the simultaneous transmission of power from both the motor and key.

43. The combination with a key and a motor, of a computing device, and means whereby the computing device may be operated by power transmitted from either the key or the motor or from both simultaneously.

44. The combination with a computing device, of an operating element therefor, a motor and a key, and separate driving connections between the operating element and the motor and key respectively.

45. The combination with a computing device, of an operating element therefor, a motor, means for making and breaking an operative connection between the motor and the operating element, a key, and separate means for making and breaking a driving connection between the key and the operating element, whereby said element may be operated by the independent action of either the key or motor or by their conjoint action.

46. The combination with a key and a motor, of a computing device adapted to be operated by the key alone or by the transmission of power from both the motor and key.

47. The combination with a computing device and an operating motor therefor, of a key movable to transmit motion to the computing device from the finger of the operator and controlling the operation of the motor.

48. The combination with a computing device and a series of keys, of means whereby motion may be transmitted from the finger of the operator to the computing device through the medium of any key, and a motor arranged to augment the power applied to the computing device from the finger of the operator and controlled by the keys.

49. In a combined typewriting and adding machine, the combination with a typewriter including a carriage, numeral keys, and printing mechanism, of a register including a series of denominational members, a master actuator for said members, the denominational relation of the register and actuator being controlled by the typewriter carriage, means whereby motion may be transmitted to the actuator from the finger of the operator through the medium of any numeral key, and a motor arranged to operate the actuator and controlled by the numeral keys.

50. The combination with a computing device, of a key, means operative upon the movement of the key to effect the driving connection between the key and the computing device, a motor, and means controlled by the key to bring the motor into action to assist in the operation of the computing device.

51. The combination with a computing device, of a series of finger keys, means for transmitting motion from the keys to the computing device, and a key-controlled motor mechanism constructed and arranged to transmit motion to the computing device.

52. The combination with a computing device including a series of denominational members, of a series of finger keys arranged to operate said members, and a key-controlled motor mechanism constructed and arranged to operate the denominational members of the computing device.

53. The combination with a computing device including a series of denominational members, of a series of keys, connections whereby any denominational member may be operated by any key, and a motor mechanism controlled by said keys and constructed and arranged to operate the denominational members of the computing device.

54. The combination with a computing device including a series of denominational members, of a motor and key, and operating connections between the motor and key, and the computing device, said motor being variable to permit the operation of the computing device thereby or by the conjoined action of both the motor and key.

55. The combination with a computing device, of a series of keys arranged to operate the computing device, a motor, means whereby the motor may be brought into operative connection with the computing device, and means for varying the power of the motor.

In testimony, that we claim the foregoing as our own, we have hereto affixed our signatures in the presence of two witnesses.

CHARLES F. LAGANKE.
JOHN ASBURY SMITH.

Witnesses:
E. A. KEENY,
JNO. R. GEYER.

Copies of this patent may be obtained for five cents each, by addressing the "Commissioner of Patents, Washington, D. C."